Nov. 17, 1925.
B. P. HOFFMAN ET AL
SWAB
Filed Nov. 19, 1923
1,562,235
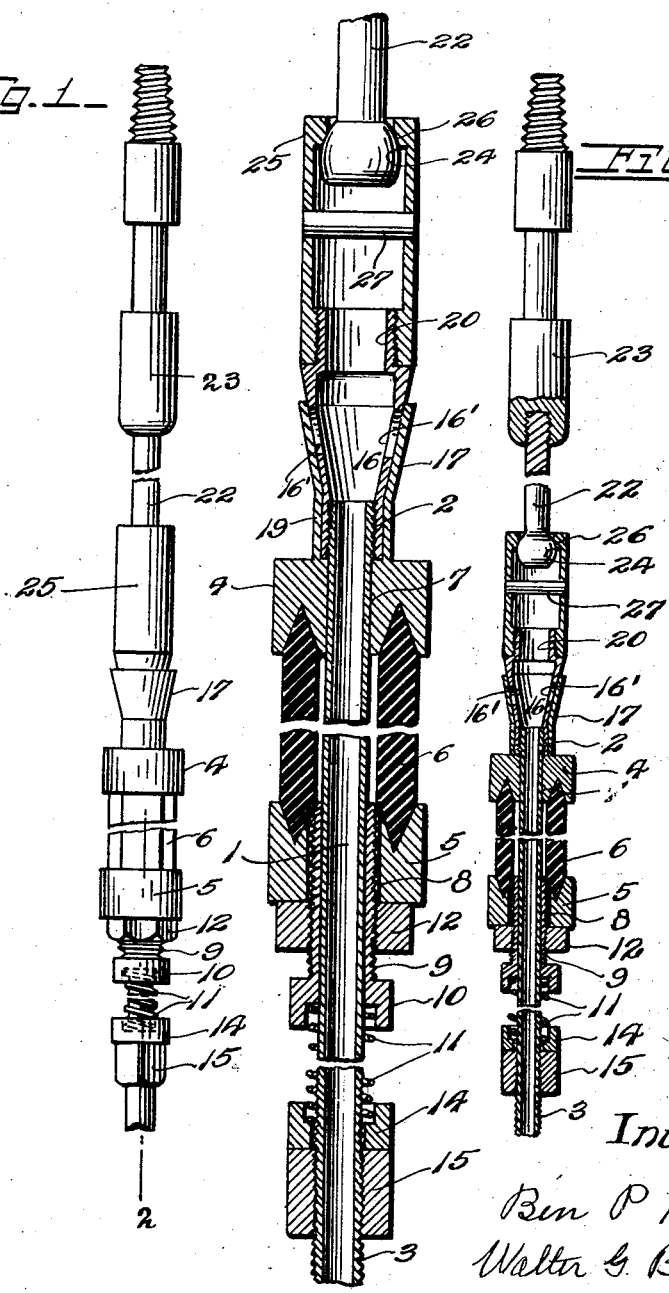
Inventor:
Ben P Hoffman
Walter G. Bisbee.

Patented Nov. 17, 1925.

1,562,235

UNITED STATES PATENT OFFICE.

BEN P. HOFFMAN AND WALTER G. BISBEE, OF BRISTOW, OKLAHOMA.

SWAB.

Application filed November 19, 1923. Serial No. 675,774.

*To all whom it may concern:*

Be it known that we, BEN P. HOFFMAN and WALTER G. BISBEE, citizens of the United States, residing at Bristow, in the county of Creek and State of Oklahoma, have invented a new and useful Swab, of which the following is a specification.

One object of this invention is to construct a device of the class described involving a swivel connection, one of the elements of the swivel also acting as a valve for the admission of the fluid.

Another object of the invention resides in the provision of a valve, the opening and closing of which is regulated by a coiled spring, the tension of the latter being adjustable by means of suitably arranged threaded nut members.

Another object resides in the particular construction and arrangement of the packing element, the purpose of which is not only to permit adjustment, but also to eliminate the injury of same and resultant blocking of the passage on withdrawing from the well.

Other features of construction and novel arrangement of parts whereby agitation of the bottom of the well, the creation of a partial vacuum on the sand with a hole full of fluid and the automatic release of the excess amount of fluid, will more clearly hereinafter appear by reference to the accompanying drawings and specification, wherein like numerals of reference designate corresponding parts throughout the several views, in which:—

Fig. 1 is a side elevation showing the present invention assembled,

Fig. 2 is an enlarged vertical sectional view of the packer, and

Fig. 3 is a similar view of Fig. 1.

Referring now to the various details of construction, reference numeral 1 indicates a portion of tubing threaded at its upper and lower ends 2 and 3. A packer is arranged for movement on this tube 1 and includes the upper and lower guide blocks 4 and 5 and the intermediate cylindrical rubber packing element 6, the latter having upper and lower tapered edges forming seat portions of conical cross-section which are fixed in similar recesses in the blocks 4 and 5 heretofore mentioned. The guide blocks 4 and 5 having central openings 7 and 8 respectively of suitable diameter to permit free longitudinal movement with respect to the tube 1, it being obvious that the central opening 8 in the lower block 5 is of greater diameter than the opening in the upper block 4 due to the necessity of permitting the passage of the nipple 9. The nipple 9 includes the elongated exteriorly threaded portion and the enlarged thimble portion 10 formed with the annular recess for the reception of the spring 11. A nut 12 is provided and formed with threads for engagement with the threads of the elongated threaded nipple portion. This nut engages the lower face of the lower block 5 of the packer structure and when moved acts to adjust the cylindrical rubber packing element 6. The entire nipple structure and the packer are both free to move on the tube 1 under the tension of the spring 11 which, as heretofore stated, seats in the cylindrical socket portion of the nipple thimble 10. A similar socket member 14 receives the lower end of the spring and is engaged and adjusted by means of the nut 15, the latter traveling on the lower threaded portion of the tube 1.

Obviously from the foregoing, the adjustment of the spring tension by movement of the nut 15 on the threaded tube will result in a tendency on the part of the packer and co-related parts to move upwardly and this upward movement is limited by engagement of the conical valve portions 16 and 17. The inner valve portion 16 comprises intermediate inverted truncated cone portions 18, the lower internally threaded portion 19 and the upper exteriorly threaded reduced portion 20, the intermediate portion being formed with openings 16'. The threads of the portion 19 engage the exterior threads on the upper portion of the tube 1 and the upper exterior threads on the reduced portion 20 engage interior threads formed in the lower portion of the casing 21. The outer valve member 17 is shaped to correspond to the intermediate and lower portions of the inner valve member 16 and is formed in the present instance by an integral extension of the upper block member 4. Obviously, this outer valve member 17 may be made an independent element and when so made, will be suitably attached to the upper block.

By the construction and arrangement above outlined it will be readily seen by one skilled in the art that the tension of the spring will regulate the seating tendency of valve 17.

For connecting the casing 21 to the stem, a pin 22 is threaded into the connecting member 23. This pin 22 is formed with an enlarged head having a regular rounded upper face 24 to act as a valve face and likewise act as the head of a swivel. The casing 21 is flanged inwardly at its upper end at 25 and a central passage 26 is formed therein, the inner lower edge of which is curved to conform to the contour of the upper face of the head of the pin. This opening 26, may by the arrangement indicated, be closed by engagement of the headed portion with the curved face, and likewise, due to the construction of these elements, a swivel action is present which provided for movement of the parts when necessary because of the twisting of the cable or the like. To limit the downward movement of the valve or swivel member, a pin 27 is fixed transversely of the casing 21 at a point such as will permit the necessary movement of the parts for satisfactory operation.

Referring more particularly to the operation of the various elements comprising the present invention, attention is first directed to the fact that the rubber packer is adjustable by movement of the nut 12 and the tension of the spring, and consequently the seating tendency of the valve 16—17 is regulated by movement of the nut 15. Accordingly, before utilization, the proper adjustment of the parts are made by movement of these nuts 12 and 15 and the arrangement can then be lowered into the casing for the desired operation. During movement into and out of the casing, any twisting or similar movement will be accommodated by means of the upper swivel member which likewise is the upper valve. This upper valve is opened by lowering the stem after the packer becomes stationary and is closed by an upward movement of such stem.

During the withdrawal of the apparatus, the conical valve will automatically open against the tension of the spring at the point predetermined by the adjustment of the spring through movement of the nut 15 heretofore mentioned.

The various functions procured by the present structure will be clear to one familiar with the art, and it will be obvious that numerous changes in details of construction and arrangement of parts can be made without departing from the spirit of the invention.

Having thus described our invention, what we claim as new and desire to secure by Letters Patent is:—

1. In a device of the class described, a tubular member having upper and lower threaded portions, a packing element arranged for movement on the tubular member, means for expanding said packer, a valve casing fixed to said tubular member and a valve carried by said packer.

2. In a device of the class described, a tubular member, a packer arranged for movement on said tubular member, a series of ports arranged to permit exterior communication from within said tubular member, and means for closing said ports carried by said packer.

3. In a device of the class described, a tubular member formed with an upper threaded extremity, a conical tubular member formed with threads for engagement with the threads of the tubular member, and having a series of perforations formed therein, a packer arranged to travel on said tubular member, means for closing the ports in said conical member, and a spring for operating the port closing means.

4. In a device of the class described, a perforated conduit, an adjustable packer carried by said conduit, a cap for the upper end of said conduit formed with a central opening, and a supporting element for said conduit including a valve for said central opening.

5. In a device of the class described, a tubular conduit, an adjustable packer carried by said conduits, a series of ports in the walls of said conduit, a closure for said ports, a cap for said conduit formed with a central opening and a valve for said central opening formed with a supporting shank for said conduit.

6. In a device of the class described, a tubular conduit formed with lateral ports, a packer arranged for movement on said conduit, a valve for said ports carried by said packer, means for retaining said valve in closed position, a cap for said conduit formed with a central opening, a valve for said opening and a supporting shank extending from said valve.

7. In a device of the class described, a tubular conduit formed with lateral ports, a packer arranged for movement on said conduit, a valve for said ports carried by said packer, means for retaining said valve in closed position, a cap for said conduit formed with a central opening, and means for closing said opening including a swivel ball formed with a threaded shank portion.

8. In a device of the class described, a tubular conduit formed with lateral ports, a packer arranged for movement on said conduit, a valve for said ports carried by said packer, means for retaining the valve in closed position, a cap for said conduit formed with a central opening, a valve for said opening including a ball having an elongated shank portion, said ball being adapted for swivel movement within said cap.

BEN P. HOFFMAN.
WALTER G. BISBEE.